(No Model.)
W. T. & W. ANGUS.
CONVERTIBLE SEAT FOR VEHICLES.
No. 410,393. Patented Sept. 3, 1889.
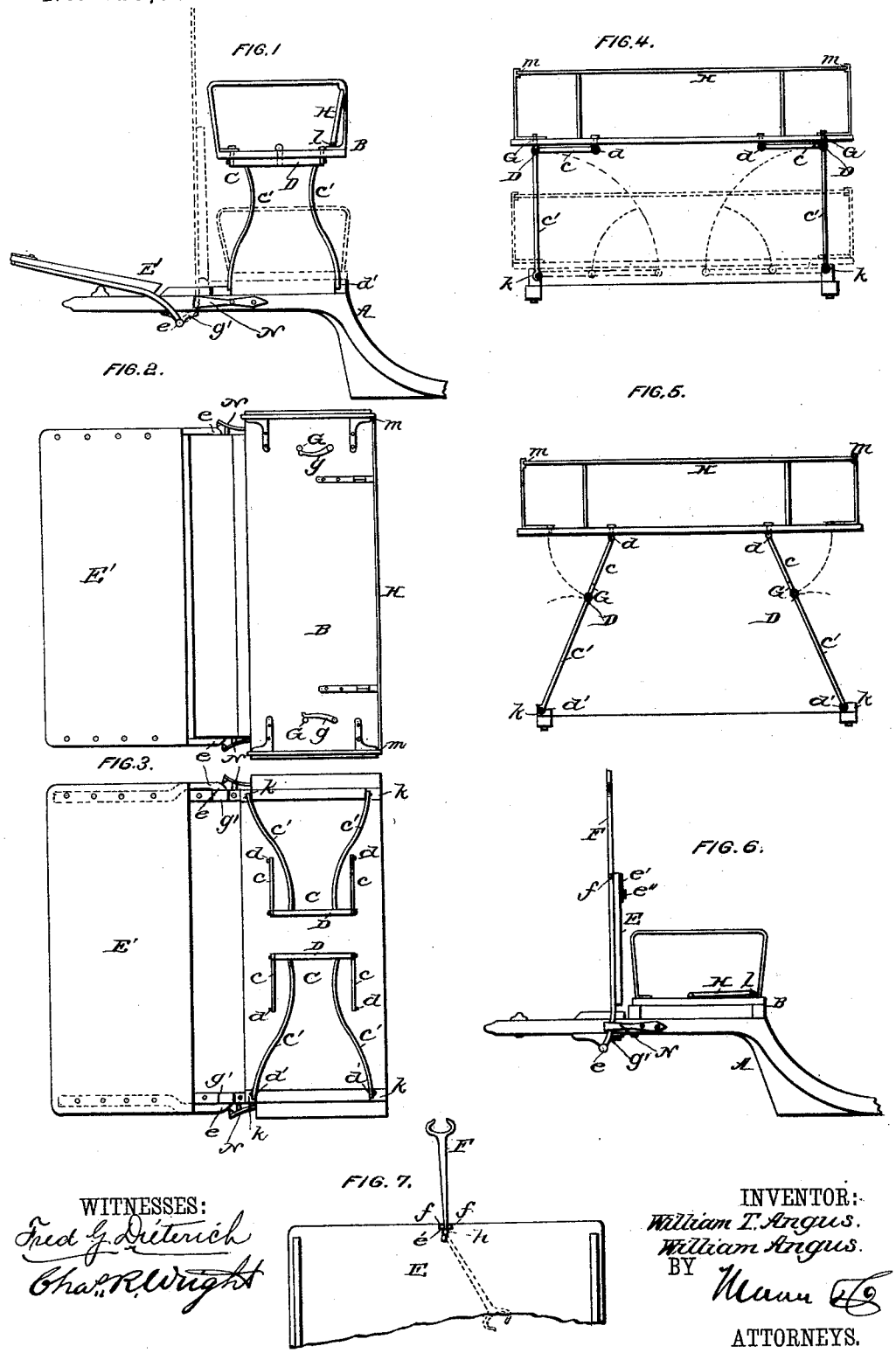
WITNESSES:
Fred G. Dieterich
Chas. R. Wright
INVENTOR:
William T. Angus.
William Angus.
BY
Mann
ATTORNEYS.

UNITED STATES PATENT OFFICE.

WILLIAM THOMAS ANGUS AND WILLIAM ANGUS, OF SYDNEY, NEW SOUTH WALES.

CONVERTIBLE SEAT FOR VEHICLES.

SPECIFICATION forming part of Letters Patent No. 410,393, dated September 3, 1889.

Application filed December 4, 1888. Serial No. 292,682. (No model.) Patented in New South Wales December 21, 1887, No. 401; in Victoria February 15, 1888, No. 5,627; in Queensland February 16, 1888, No. 393, and in South Australia February 27, 1888, No. 976.

*To all whom it may concern:*

Be it known that we, WILLIAM THOMAS ANGUS and WILLIAM ANGUS, coach-builders, citizens of Great Britain, residing in the city of Sydney, in the Colony of New South Wales, have invented a new and useful Convertible Seat for Victorias and Phaetons, (for which we have obtained patents in New South Wales, No. 401, bearing date December 21, 1887; in Victoria, No. 5,627, bearing date February 15, 1888; in Queensland, No. 393, bearing date February 16, 1888, and in South Australia, No. 976, bearing date February 27, 1888,) of which the following is a specification.

The object of this invention is to provide efficient and convenient means for altering the position of the front seat and accessory parts of a phaeton to make such phaeton resemble that style of vehicle known as a "victoria," and likewise to transform such a vehicle as a victoria into a phaeton.

The invention consists, essentially, in supporting the said seat upon knuckle-joints, which can be operated without adding or removing any of the parts. These knuckle-joints are pivoted vertically to the bed-frame of the vehicle and to the seat. When the vehicle is to be employed as a phaeton, the inside front seat is in the normal position; but when it is to be employed as a victoria such seat is elevated and supported on the said knuckle-joints, and the dash-board and other parts adapted to suit the change thus effected and to form the foot-board and other necessary conveniences for the driver's seat thus formed. In the former case the knuckle-joints are free from observation, being folded down below the seat.

But to make our invention and the construction and arrangement of the mechanism, we employ for the aforesaid purposes better understood, we shall now proceed more particularly to describe the same, and for the purpose of illustration refer to the accompanying sheets of drawings, in all the figures of which the same letters and figures of reference indicate corresponding parts.

Figure 1 is a side elevation of part of the frame of a phaeton, showing the inside front seat raised up to constitute a driver's seat, as in a victoria. In this figure the position of the said seat, when used as an inner front seat, is illustrated by dotted lines, as is likewise the altered position of the dash-board, which being hinged at the foot is thrown to form a foot-board. Fig. 2 is a plan of the seat and foot-board, as shown in elevation in Fig. 1. Fig. 3 is a plan similar to Fig. 2, but with the seat proper removed in order to expose to view the supporting knuckle-joints. Fig. 4 is a rear elevation of the seat when arranged for the use of a driver, as in a victoria. Fig. 5 is an end view of the seat as it appears while being changed from the position illustrated in Fig. 6 to that illustrated in Fig. 4. Fig. 6 is a side elevation of the seat, arranged as an inside front seat, as in a phaeton. Fig. 7 illustrates details of the rein-guide.

The frame A of the vehicle does not undergo any structural change in altering the position of the seat B; but the transformation is effected by the manipulation of the knuckle-joints C. There are four knuckle-joints, each of which consists of an arm $c$ and a limb $c'$, which fold up, the upper extremity $d$ of each arm being suitably pivoted to the bottom of the seat, and the lower extremity $d'$ of the limbs to the bed-frame. The four knuckle-joints thus constitute two pairs of supports, one for each end of the seat. Each pair is coupled together by a transverse bar D, which passes through eyes in the extremities of the arms and limbs.

The dash-board E, which forms also the back-rest of the front seat of the vehicle, when that seat is being used as an inside seat, as in a phaeton, can be converted into a foot-board E', when the front seat is transformed into an outside seat for a driver, as in a victoria. This is accomplished by hinging or pivoting it at its lower edge $e$ in bearings $g'$ on the bed-frame of the vehicle, so that it can be thrown down from its normal position, as shown in Fig. 6, to the position shown in Fig. 1, when required. $e'$ is a spring-catch secured to the back of the dash-board by means of a bolt or other suitable fastening $e''$. The free or upper end of this catch is formed into two fingers $f$, between which fingers sufficient space is left for the stem of the rein-guide to enter. The rein-guide F is pivoted to the front of the dash-board at $h$, as shown. When being used as such, the rein-guide is set in the position shown in Fig. 6, and retained, as there shown, by the fingers aforesaid. When the dash-board is turned down to form a foot-board, the rein-guide being not needed is turned down, as in Fig. 7, and retained, as there shown, by the same means. In altering the positions of the said rein-guide the spring-catch $e'$ is drawn or held back to allow it to swing past without hinderance therefrom.

To each of the transverse bars D a catch-bolt G may be fixed, which (when the seat is arranged for the driver's use, as illustrated in Figs. 1 and 4) pass up through holes in the seat B, and are clipped or otherwise suitably secured by hooks, or spring-bolts, or clips $g$. The pivots or hinges $d'$ are provided with stops $k$, to prevent swaying when the seat is elevated.

When the seat is being used as an inside front seat, as in a phaeton, the knuckle-joints C are collapsed and folded down under the seat, as shown at Fig. 6.

H is a folding back-rest hinged to the seat at $l$ and capable of being folded down below the cushion, as in Fig. 6, when the vehicle is being used as a phaeton, and of being swung up, as in Fig. 1, when the vehicle is being used as a victoria. Stops $m$ are provided to retain it in the last-named position.

Spring-catches N are arranged, as illustrated, on the frame to retain the dash-board in the position illustrated in Fig. 6.

What we claim as our invention or discovery, and desire to protect and secure by Letters Patent of the United States, is—

1. A vehicle having its dash-board adjustable and provided with a vertically-adjustable seat, substantially as described.

2. A vehicle having its dash-board hinged and provided with a vertically-adjustable seat, substantially as described, whereby the dash-board is made to serve as a foot-board when the seat is elevated and a back to the seat when the latter is lowered, as set forth.

3. The combination, with the body of a vehicle, of a seat connected to the body just in rear of the dash-board by collapsible knuckle-joints, whereby the seat may be raised or lowered and held in the same vertical plane, whether raised or lowered, substantially as described.

4. The combination, with the body of a vehicle, of a seat, the arm $c$, pivoted to the seat, the limb $c'$, pivoted to the body, and the transverse bar D, pivoted to the arm and limb, substantially as herein shown and described.

5. The combination, with the body of a vehicle, of a seat, the arm $c$, pivoted to the seat, the limb $c'$, pivoted to the body, the transverse bar D, pivoted to the said arm and limb, and a catch-bolt secured to the said bar and engaging the seat, substantially as herein shown and described.

6. The combination, with a vehicle-body, of a dash-board hinged to the body and a spring-catch secured to the body and engaging the dash-board to hold it in a vertical position, substantially as herein shown and described.

WILLIAM THOMAS ANGUS.
WILLIAM ANGUS.

Witnesses:
CHARLES G. HEPBURN,
W. I. SYMSON,
*Patent Agents, Sydney.*